United States Patent
Siegle et al.

(10) Patent No.: US 6,256,302 B1
(45) Date of Patent: Jul. 3, 2001

(54) METHOD FOR THE COMMON TRANSMISSION OF DIGITAL AND ANALOGUE MODULATED RADIO BROADCASTING AND/OR TELEVISION BROADCASTING SIGNALS

(75) Inventors: Gert Siegle; Hamed Amor; Hendrick Mahn, all of Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/011,154

(22) PCT Filed: Sep. 19, 1996

(86) PCT No.: PCT/DE96/01776

§ 371 Date: Jan. 29, 1998

§ 102(e) Date: Jan. 29, 1998

(87) PCT Pub. No.: WO97/11539

PCT Pub. Date: Mar. 27, 1997

(30) Foreign Application Priority Data

Sep. 22, 1995 (DE) .................................. 195 35 327

(51) Int. Cl.$^7$ .................. H04Q 7/00; H04J 1/00; H04J 1/02; H04H 1/04
(52) U.S. Cl. .................. 370/343; 370/334; 370/480; 370/487; 370/495
(58) Field of Search .................. 370/343, 334, 370/480, 487, 490, 493, 494, 495; 348/6, 7, 12, 13, 460, 465, 467

(56) References Cited

U.S. PATENT DOCUMENTS

| | | | |
|---|---|---|---|
| 4,684,981 | * | 8/1987 | Toyoshima et al. .................. 358/86 |
| 4,757,495 | * | 7/1988 | Decker et al. .................. 370/76 |
| 4,821,097 | * | 4/1989 | Robbins .................. 358/143 |
| 5,150,365 | * | 9/1992 | Hirata et al. .................. 370/123 |
| 5,450,392 | * | 9/1995 | Waltrich .................. 370/6 |
| 5,949,793 | * | 9/1999 | Bossard et al. .................. 370/487 |
| 5,959,660 | * | 9/1999 | Levan .................. 348/12 |

* cited by examiner

Primary Examiner—Huy D. Vu
Assistant Examiner—M. Phan
(74) Attorney, Agent, or Firm—Michael J. Striker

(57) ABSTRACT

A method is described that is used for common transmission of digital- and analog-modulated radio and/or television signals, in particular over a broad band cable system (30). The method includes transmitting at least one digital radio and/or television signal along with an analog television signal in one and the same channel, in which the frequency spectrum of the at least one digital radio and/or television signal is limited to a frequency range that is less than the width of the at least one channel. To lessen the influence of the at least one digital radio and/or television signal on the analog television signal, the at least one digital radio and/or television signal must fall below a predetermined signal level, and the peak level of the analog television signal must exceed a predetermined value, which is markedly higher than the predetermined signal level of the at least one digital radio and/or television signal. To prevent cross-modulation between analog- and digital-modulated radio and/or television signals, the amplitude of the frequency spectrum of the at least one digital radio and/or television signal must fall below a predetermined value, which is markedly lower than the amplitude of the video carrier of the analog television signal.

22 Claims, 6 Drawing Sheets

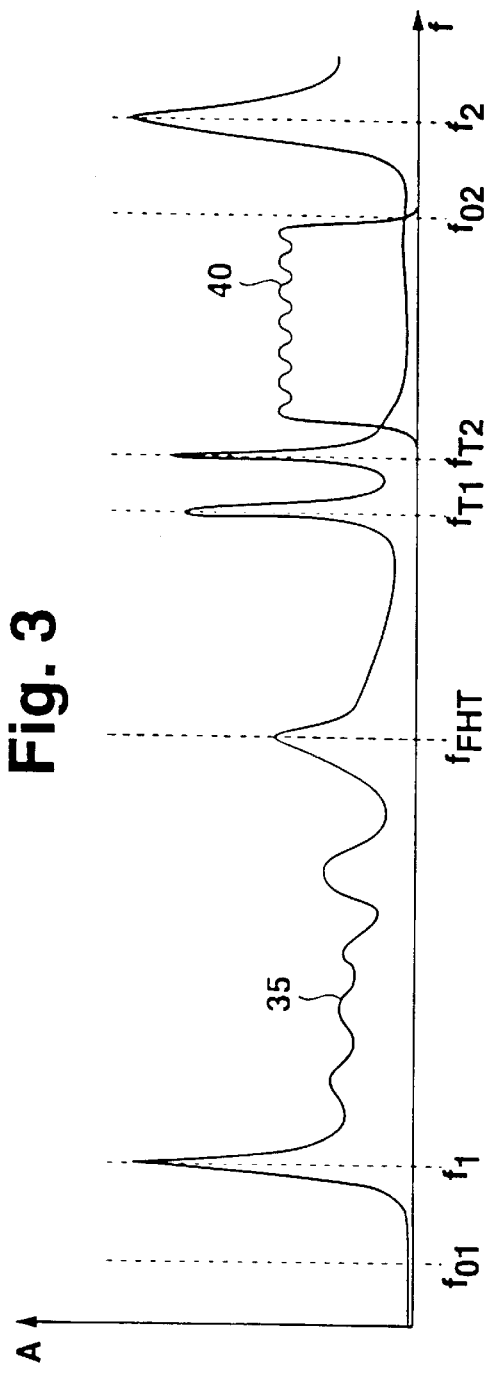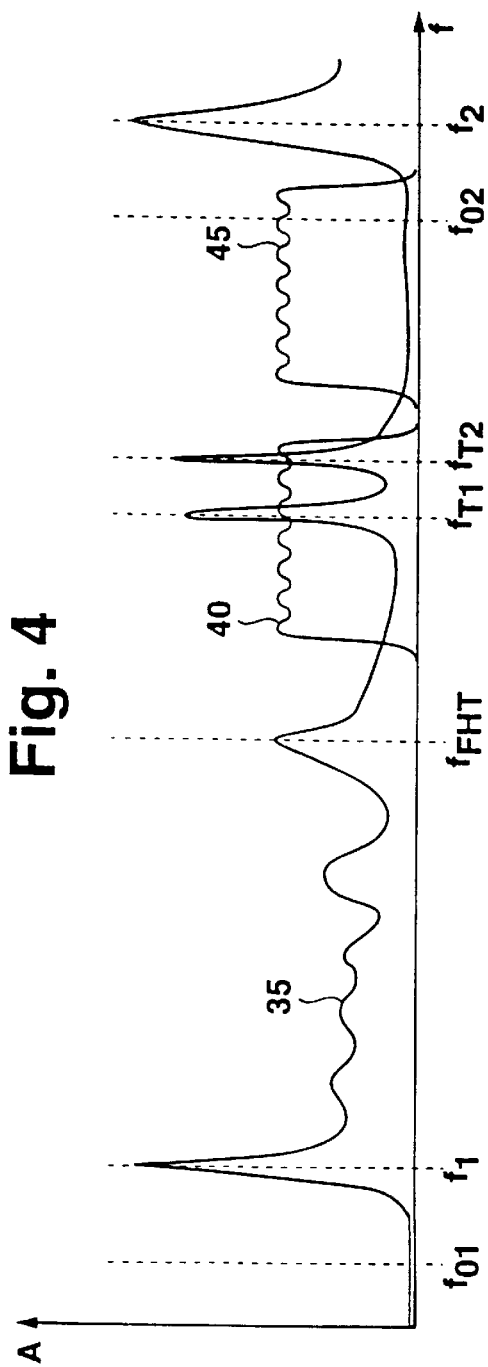

METHOD FOR THE COMMON TRANSMISSION OF DIGITAL AND ANALOGUE MODULATED RADIO BROADCASTING AND/OR TELEVISION BROADCASTING SIGNALS

BACKGROUND OF THE INVENTION

The present invention relates to a method for common transmission of digital-modulated and analog-modulated radio and/or television signals, especially over a broadband cable system.

The journal "Funkschau" [Broadcasting Review] No. 9, 1995, p. 46, discloses a transmission method in which a flexible multiplexer at the output of a video server combines a plurality of program signals with different data rates into a transmission package; the digital summation signal is QAM-modulated (QAM=quadrature amplitude modulation) and is then transmitted parallel to the analog TV signals already fed into a cable. The digital signal then occupies one entire TV channel of the kind that was previously needed for a single analog television program.

SUMMARY OF THE INVENTION

It is an object of the present invention to provide an improved method for common transmission of digital-modulated and analog-modulated radio and/or television signals, especially over a broadband cable system, which provide increased transmission capacity without significantly increasing side channel interference.

According to the invention the method for common transmission of digital-modulate and analog-modulated radio and/or television signals comprises the steps of:

a) transmitting at least one digital signal together with an analog television signal in a common channel of at least one communications channel;

b) controlling a signal level of the at least one digital radio and/or television signal so that it does not exceed a predetermined digital signal level;

c) controlling a signal level of the analog television signal so that it does not drop below a predetermined analog signal level which is much greater than the predetermined digital signal level of the at least one digital radio and/or television signal;

d) controlling the at least one digital radio and/or television signal so that an amplitude of a frequency spectrum of the at least one digital radio and/or television signal does not exceed a predetermined amplitude value, which is much lower than an amplitude of a video carrier of the analog television signal; and e) controlling the at least one digital radio and/or television signal so that the frequency spectrum of the at least one digital radio and/or television signal is limited to a frequency range smaller than a width of the common channel.

The method of the invention has the advantage over the prior art that the transmission of digital-modulated radio and/or television signals with an analog television signal in one and the same channel leads to a marked increase in transmission capacity, so that substantially more radio and/or television programs can be transmitted.

In a preferred embodiment of the method the data quantity of the at least one digital radio and/or television signal is reduced by coding so that additional digital radio and/or television signals can be transmitted together with the analog television signal in the one channel, thus further increasing the transmission capacity.

It is also advantageous to utilize the channel for transmitting further supplementary data. Once again, still a further increase in transmission capacity is thereby achieved.

By suitably disposing the frequency range of the at least one digital radio and/or television signal between two carrier frequencies, possible influences of the digital and analog signals on one another can advantageously be kept slight and below a threshold of perceptibility.

By transmitting audio carrier frequency components of the analog television signal with predetermined attenuation it is possible in a preferred embodiment to obtain an improvement in the signal to noise ratios for the digital signals by attenuation of interfering video and audio carrier frequency components of the transmitted analog radio and/or television signals.

In a preferred embodiment of the method the individual digital radio and/or televisions signals are combined into blocks in the at least one channel and the frequency ranges of at least two of the transmitted digital radio and/or television signals are separated from one another by a protective frequency spacing. The advantage of this feature is that mutual interference between the signals is avoided.

An advantage in the modulation of one or more digital radio and/or television signals combined into a multiplex signal in accordance with a preferred embodiment of the method is the selection of carrier frequencies that for at least one audio carrier frequency, color auxiliary carrier frequency or video carrier frequency of the analog television signal do not fall below a predetermined frequency spacing. In this way, because critical video and audio carrier frequencies are blanked out, interference of carrier frequencies on the analog television signal with the spectrum of the digital multiplex signal is prevented.

The frequency range of one or more digital radio and/or television signals, combined into a multiplex signal, is advantageously split between video and audio carrier frequencies of the analog television signal, and the corresponding video and audio carrier frequencies of the analog television signal are advantageously separated by one protective frequency spacing each. In this way, even digital multiplex signals that because of the width of their frequency range can be accommodated in the channel of the analog television signal only with difficulty without interfering superposition with video and audio carrier frequencies of the analog television signal, can be accommodated entirely without problems between the individual interfering video and audio carrier frequencies of the analog television signal because of the described splitting of their frequency range, for instance by blanking out carrier frequencies of the multiplex signal, thus averting their superposition on one another, which would cause interference.

In a preferred embodiment advantageously the transmission of one or more digital radio and/or television signals, can be combined into a multiplex signal, in an arbitrary direction. In this way, via the broad band cable system, interactive radio or television and/or telecommunications can be carried out, above all including the utilization of the transmission of digital supplementary data in accordance with the preferred embodiment described above.

Another advantage of this preferred embodiment is also the realization of reverse data channels in broad band cable systems, without requiring additional frequencies or without having to change the conventional frequency allocation of the broad band cable system.

An apparatus transmitting and receiving digital multiplex signals modulated according to an OFDM method, preferably digital radio and/or television signals, comprises, for reception, a tuner circuit for selecting a channel of the transmitted frequency band, a demodulator for demodulating the OFDM modulated signals, a decoder for error evaluation of the received digital signals, a demultiplexer for splitting the corresponding multiplex signal into individual digital signals and an interface device for connection of data playback devices and/or optical broadband distribution network, especially using fiber optic devices; and, for transmission, a channel adaptation unit for coding and combining individual digital signals transmitted via the interface device from a data playback device and/or from the optical broadband distribution network connected to the interface device into a multiplex signal; a modulator for modulating the multiplex signal at carrier frequencies in frequency channels, especially for transmission of analog television signals and a coupler for connection to a broadband cable system, which is connected to the tuner circuit and the modulator. The apparatus according to the invention has the advantage that interactive radio or television and/or telecommunications using digital multiplex signals modulated by an OFDM method is enabled by coupling both receiving and transmitting components to the broad band cable system.

Advantageous preferred embodiments of this apparatus are possible. An especially advantageous feature is the reduction of the data rate of the digital multiplex signal, in that signal components of the multiplex signal to be transmitted are to be modulated to the carrier frequencies which exceed a predetermined frequency spacing from at least one audio carrier frequency and/or one color auxiliary carrier frequency and/or one video carrier frequency of an analog television signal. In this way, with the apparatus, multiplex signals that are not interfered with by the video and audio carrier frequencies of an analog television signal can be generated.

BRIEF DESCRIPTION OF THE DRAWING

The objects, features and advantages of the invention will now be illustrated in more detail with the aid of the following description of the preferred embodiments, with reference to the accompanying figures in which:

FIGS. 2 to 4 are graphical illustrations of respective examples of signal spectra in an analog channel;

DESCRIPTION OF THE PREFERRED EMBODIMENTS

Figure 1:
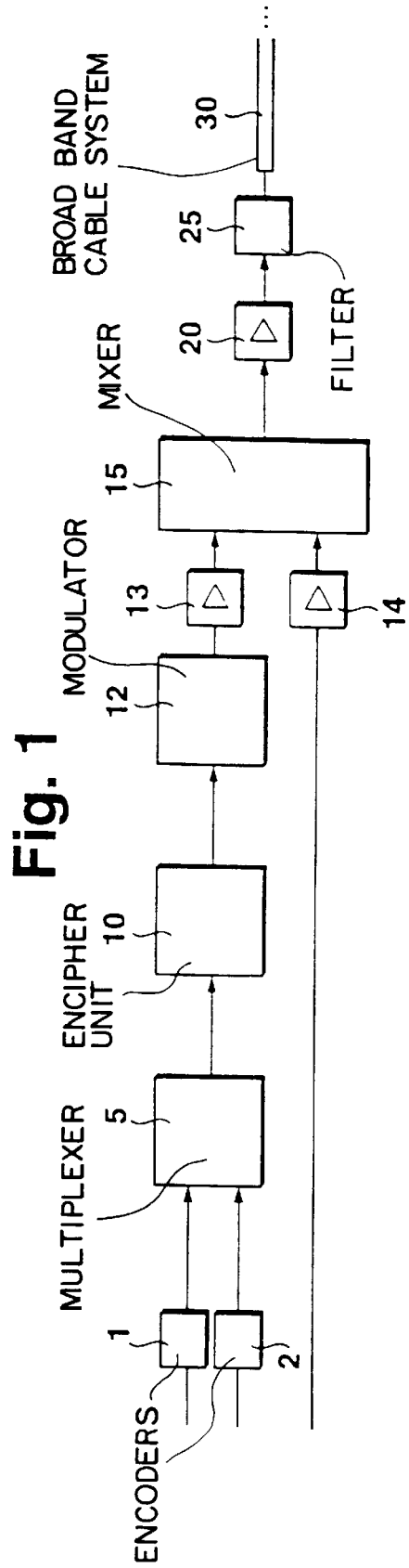
FIG. 1 is a block diagram of an apparatus for feeding digital and analog radio and/or television signals into a broadband cable system.

In FIG. 1, reference numeral 5 designates a multiplexer, to which via a first encoder 1 a digital television signal and via a second encoder 2 a digital radio signal are delivered. Via an enciphering unit 10, a modulator 12 and a first amplifier 13, the multiplexer 5 is connected to a mixer 15, to which an analog television signal is delivered via a second amplifier 14. The signal generated in the mixer 15 is fed into a broad band cable system 30, of which only one cable input is shown in FIG. 1, via a third amplifier 20 and a filter 25 for audio carrier frequency components of the analog television signal. The output of the first amplifier 14 represents the output of a first transmitter for transmitting digital-modulated radio and/or television signals. The output of the second amplifier 14 then represents the output of a second transmitter for transmitting analog or analog-modulated radio and/or television signals. The digital- and analog-modulated radio and/or television signals may also be transmitted from a single transmitter, which then includes both the output of the first amplifier 13 and the output of the second amplifier 14, and whose output is the output of the filter 25.

The analog television signal delivered to the second amplifier 14 is amplified in the amplifier 14 to a signal level, so that the peak level of the analog television signal exceeds a predetermined value, for instance of 65 dB $\mu$V. The digital signals delivered to the multiplexer 5 via the first encoder 1 and the second encoder 2 are combined, frequency-multiplexed, into a digital signal in the multiplexer 5 and then enciphered in the enciphering unit 10. The two encoders 1 and 2 reduce the quantity of data in the digital television signal and the digital radio signal, so that a limitation of the frequency spectra of the digital signals is accomplished, each to a predetermined frequency range that is less than the width of the channel of the analog television signal. To reduce the data quantity in the digital television signal, data compression algorithms are suitable, such as MPEG1, MPEG2 or MPEG4 (MPEG=motion picture expert group). For audio data reduction, the MPEG standard is equally suitable. The enciphered digital signal is then, in the modulator 12, subjected to a modulation process, such as the COFDM process (COFDM=coded orthogonal frequency division multiplexing), the PSK process (PSK=phase shift keying), or the QAM process. The goal of this provision is to limit the amplitude of the frequency spectrum of the digital signal to a predetermined value that is markedly less than the amplitude of the video carrier of the analog television signal, so that if at all possible cross-modulation with the analog television signal does not occur. Next, in the first amplifier 13, the modulated digital signal is adjusted in level to a value that is 20 to 30 dB lower than the value predetermined for the peak level of the analog television signal. In the mixer 15, the digital signal is superimposed on the analog television signal. The resultant signal is then adjusted in its level to the predetermined values via the amplifier 20. Finally, the filter 25 is used to lower the signal level in the range of the audio carrier frequencies of the analog television signal by a predetermined value that has no significant influence on the playback or reproduction quality of the received sound for the user. In the exemplary embodiment described, such attenuation can amount to up to 10 dB compared with the typical audio levels in broad band cable systems. This provision improves the reception of the digital signal or its signal to noise ratio. This plays a role above all whenever the frequency range of the digital signal is superimposed on the frequency range of the audio carrier. The task of the modulator 12, finally, is also to convert the frequency ranges of the digital signals into the channel of the analog television signal. Depending on the range of the broad band cable system 30, this broad band cable system has additional amplifiers and filters for audio carrier frequency components, so that the transmitted signal will remain adjusted in its level to the predetermined values.

It is also possible for a digital signal additionally to be impressed, as described above, on the analog television signal that is broadcast via a transmission system; the digital signal can be broadcast either by the same transmission system or some other transmission system.

Along with a digital radio or television program, it is also possible to transmit digital supplementary data. These supplementary data include traffic reports, transportation schedules, weather reports, or theater and movie schedules.

Figure 2:
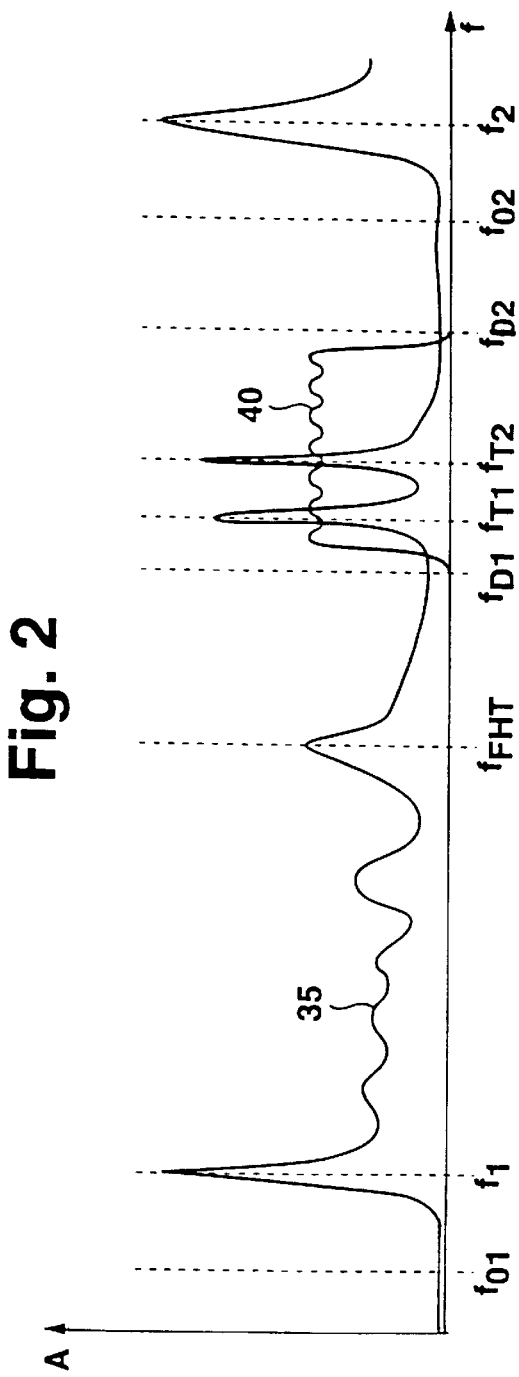

FIG. 2 shows one example of a frequency spectrum of the channel of the analog television signal. The amplitude A is plotted over the frequency f. The channel is defined by a lower limit frequency $f_{01}$ and an upper limit frequency $f_{02}$. The spectrum 35 of the analog television signal is located in this channel and has a video carrier at a frequency $f_1$ and a color auxiliary carrier at a frequency $f_{FHT}$ which is greater than the video carrier frequency $f_1$. The spectrum 35 also has a first audio carrier at a frequency $f_{T1}$ and a second audio carrier at a frequency $f_{T2}$. Both audio carrier frequencies $f_{T1}$ and $f_{T2}$ are greater than the color auxiliary carrier frequency $f_{FHT}$. The second audio carrier frequency $f_{T2}$ is greater than the first audio carrier frequency $f_{T1}$. The video carrier at the frequency $f_1$ has the highest amplitude, followed by the amplitudes of the two audio carriers at the frequencies $f_{T1}$ and $f_{T2}$ and the color auxiliary carrier at the frequency $f_{FHT}$. Between the video carrier at the frequency $f_1$ and the color auxiliary carrier at the frequency $f_{FHT}$, the spectrum of the analog television signal has a relatively high amplitude in comparison with the range between the color auxiliary carrier at the frequency $f_{FHT}$ and the upper limit frequency $f_{02}$, except for the two audio carriers at the frequencies $f_{T1}$ and $f_{T2}$. Above the color auxiliary carrier frequency $f_{FHT}$, a spectrum 40 of a digital radio and/or television signal between a lower limit frequency $f_{D1}$ and an upper limit frequency $f_{D2}$ is superimposed on the spectrum 35 of the analog television signal. In this way, the spectrum 40 of the digital signal is accommodated in a range of the channel in which, with the exception of the two audio carriers at the frequencies $f_{T1}$ and $f_{T2}$, the spectrum of the analog television signal has a relatively small amplitude, so that interference of the digital signal by the analog television signal is kept as slight as possible. The lower limit frequency $f_{D1}$ of the spectrum 40 of the digital signal is lower than the two audio carrier frequencies $f_{T1}$, and $f_{T2}$, and the upper limit frequency $f_{D2}$ of the spectrum 40 of the digital signal is higher than the two audio carrier frequencies $f_{T1}$ and $f_{T2}$. The two audio carriers are thus superimposed on the spectrum 40 of the digital signal. The lower limit frequency $f_{D1}$ of the spectrum 40 of the digital signal is higher than the color auxiliary carrier frequency $f_{FHT}$, so that there is no impairment of the spectrum 40 of the digital signal by video and color carriers of the analog radio signal. The upper limit frequency $f_{D2}$ of the spectrum 40 of the digital signal is lower than the upper limit frequency $f_{02}$ of the channel, so that there is no impairment of the spectrum 40 of the digital signal by a video carrier at a frequency $f_2$, which is higher than the upper limit frequency $f_{02}$ of the channel and is thus located in a neighboring channel. Since the amplitudes of the two audio carriers at the frequencies $f_{T1}$ and $f_{T2}$ are greater than the amplitude of the spectrum 40 of the digital signal, the two audio carriers do not interfere with the digital signal. By feeding the audio carriers into the cable system 30 at predetermined attenuation, this interference is already lessened. A further reduction in interference takes place in the receiver.

In a further exemplary embodiment in accordance with FIG. 3, the spectrum 40 of the digital signal is superimposed on the otherwise unchanged spectrum of the analog television signal, in such a way that it is located between the second audio carrier frequency $f_{T2}$ and the upper limit frequency $f_{02}$ of the channel and is thus also no longer impaired by the two audio carriers.

In a further exemplary embodiment in accordance with FIG. 4, along with the spectrum 40 of the digital radio and/or television signal, a second spectrum 45 of a second radio and/or television signal is superimposed on the otherwise unchanged spectrum 35 of the analog television signal. The two spectra 40 and 45 may for instance belong to the transmitted digital radio signal or the transmitted digital television signal of FIG. 1. The frequency ranges of the two spectra 40 and 45 are introduced via the first amplifier 13 and the mixer 15 into the channel of the analog television signal in such a way that they are separated from one another by a protective frequency spacing $f_S$ and therefore do not impair one another, and are superimposed on the spectrum of the analog television signal between the color auxiliary carrier frequency $f_{FHT}$ and the video carrier frequency $f_2$ of the neighboring channel. The first spectrum 40 has the two audio carriers superimposed on it and interfering with it while conversely the second spectrum 45 is located between the second audio carrier and the video carrier frequency $f_2$ of the neighboring channel.

In an analog television signal in accordance with the PAL B standard, the width of the channel is 7 MHz. This is also equivalent to the spacing between two video carrier frequencies $f_1$ and $f_2$ of adjacent channels. For a spacing of 4.43 MHz between the video carrier frequency $f_1$ and the color auxiliary carrier frequency $f_{FHT}$, 2.57 MHz thus remain available for occupation by one or more spectra of digital radio and/or television signals. When the aforementioned encoding algorithms MPEG2 or MPEG4 are used, the bandwidth for the spectrum of a digital television signal can be limited to 1.5 MHz. In this way, a digital television signal can be transmitted between the color auxiliary carrier of the frequency $f_{FHT}$ and the video carrier, located in the neighboring channel, having the frequency $f_2$. Alternatively, up to six digital radio signals can be transmitted in a frequency band 1.5 MHz wide, with data rates normally of up to 256 kbit/s. For a channel of an analog television signal having a width of 8 MHz in accordance with the PAL G standard and a spacing of the second audio carrier frequency $f_{T2}$ from the video carrier frequency $f_1$ of 5.75 MHz, 2.25 MHz are available between the second audio carrier frequency $f_{T2}$ and the video carrier frequency $f_2$ in the neighboring channel, so that a digital television signal with a spectrum 1.5 MHz wide can be transmitted between these two frequencies with relatively little impairment by the analog television signals. If the spacing between the color auxiliary carrier frequency $f_{FHT}$ and the video carrier frequency $f_1$ remains constant at 4.43 MHz, the spacing between the color auxiliary carrier frequency $f_{FHT}$ and the video carrier frequency $f_2$ in the neighboring channel is 3.57 MHz, so that between the color auxiliary carrier and the video carrier in the neighboring channel in accordance with FIG. 4, two digital radio and/or television signals, each with a spectrum 1.57 MHz wide and a protective frequency spacing of 0.2 MHz, for instance, can be transmitted. As an alternative, instead of a digital television signal, up to six digital radio signals, with or without a protective frequency spacing, can be transmitted, so that in the channel of the analog television signal, either two television programs or one television program and six audio programs, or twelve audio programs can be accommodated. When encoding algorithms that lead to a further reduction in the data quantities are employed, the number of television and/or audio programs that can be transmitted can be increased.

Figure 5:
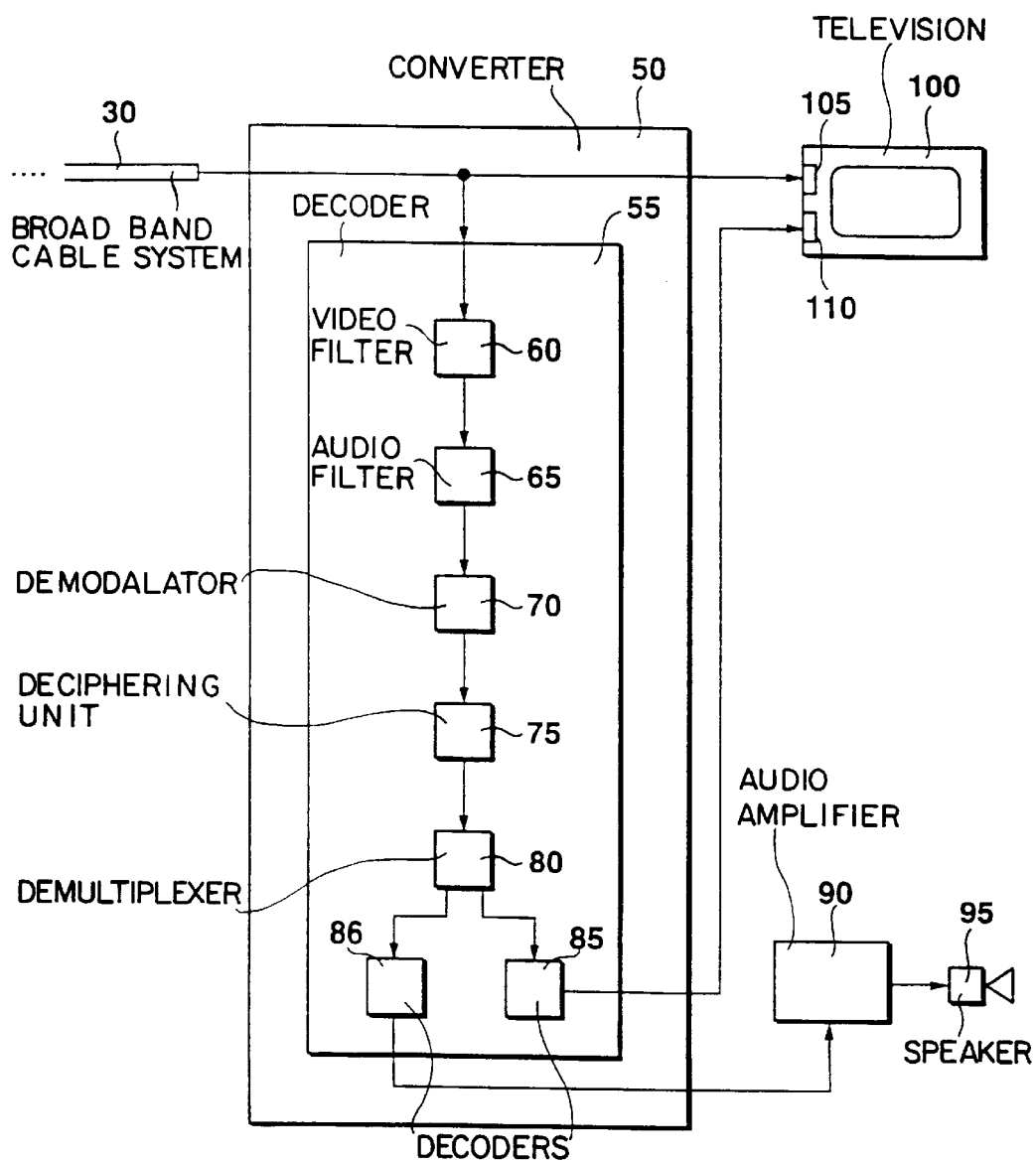
FIG. 5 is a block diagram of an apparatus for receiving transmitted data from the broadband cable system.

In FIG. 5, a cable output of the broad band cable system 30 is connected via a converter 50, which includes a decoder 55, to an analog input 105 of a television set 100 and also to a filter circuit 60, accommodated in the decoder 55, for video carrier frequency components. The filter circuit 60 for video carrier frequency components is connected to a demultiplexer 80 via a filter circuit 65 for audio carrier frequency components, a demodulator 70, and a deciphering unit 75. The demultiplexer 80 is connected to a first decoder 85 and a second decoder 86. The filter circuit 65 for audio carrier frequency components, the demodulator 70, the deciphering unit 75, the demultiplexer 80, and the two decoders 85 and 86 are likewise accommodated in the decoder 55. The first decoder 85 is connected to a digital input 110 of the television set 100, and the second decoder 86 is connected to a speaker 95 via an audio amplifier 90.

The signal received from the converter 50 via the broad band cable system 30 includes the analog television signal, the digital television signal, and the digital radio signal, which were fed into the broad band distribution network by the circuit in accordance with FIG. 1. In the analog input 105 of the television set 100, the received digital signals have the effect of noise and lead to a reduction in the signal-to-noise ratio for the analog television signal. In a realization in accordance with predetermined level values for the analog television signal and the digital signals, however, the resultant signal-to-noise ratio is tolerable. In the filter circuit 60 for video carrier frequency components, interfering video carrier frequency components, especially from neighboring video carriers, are suppressed by up to 20 dB, for instance, so that the signal-to-noise ratio for the digital signals is increased. A corresponding suppression of audio carrier frequency components of the analog television signal serves the same purpose and is effected by the filter circuit 65 for audio carrier frequency components. The two filter circuits 60 and 65 can be realized by active and/or passive components. The filtered digital signal is demodulated in the demodulator 70, deciphered in the deciphering unit 75, and finally split, in the demultiplexer 80, into the digital television signal and the digital radio signal. The two decoders 85 and 86 expand the digital radio or television signal. The digital television signal is then converted into an analog signal at the digital input of the television set 100 and played back in the form of video and audio. The digital radio signal is converted in the audio amplifier 90 into an analog signal, amplified, and delivered to the speaker 95 for audio playback.

In a further exemplary embodiment, the digital-to-analog conversion already takes place in the decoder 55, so that no digital input 110 or audio amplifier 90 is needed in the television set 100.

Figure 7:
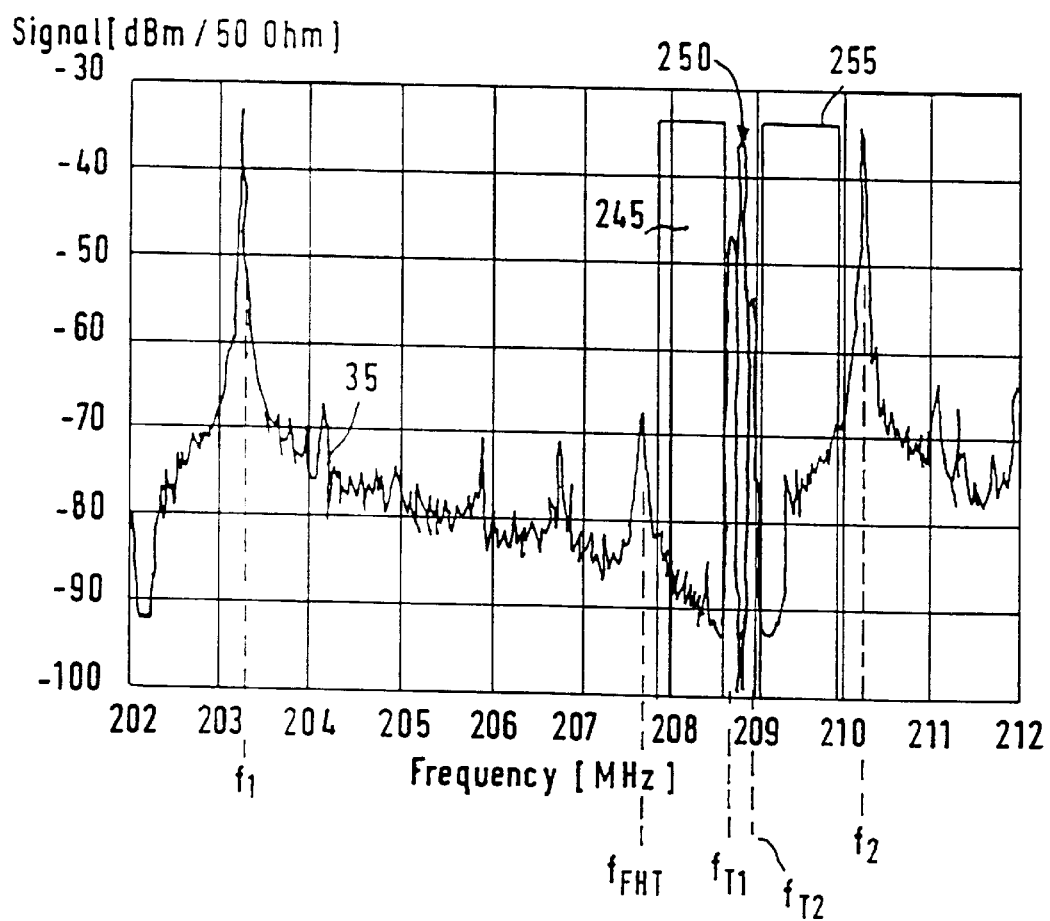
FIG. 7 is a graphical illustration showing a superposition of the spectrum of an analog television signal with a frequency range, split into three frequency blocks, of an OFDM-modulated digital multiplex signal.

FIG. 7 shows the spectrum of an analog television signal, for instance in accordance with the PAL B standard, and the width of the channel is 7 MHz. Between the color auxiliary carrier frequency $f_{FHT}$ and the frequency $f_2$ of the video carrier in the upper neighboring channel, one or more digital radio and/or television signals, combined into a multiplex signal, are superimposed on the analog television signal with the spectrum 35. The frequency range of this multiplex signal is split into three frequency blocks 245, 250 and 255 that are separate from one another. This is accomplished by providing that in the modulation in the modulator 12, for instance by an OFDM modulation process, carrier frequencies are selected that do not fall below a predetermined frequency spacing for the audio carrier frequencies $f_{T1}$, $f_{T2}$, the color auxiliary carrier frequency $f_{FHT}$, and the video carrier frequency $f_1$ of the analog television signal as well as the video carrier frequency $f_2$ of the analog television signal of the upper neighboring channel. In this way, a first portion 245 of the frequency range of the multiplex signal is transmitted between the video carrier frequency fFHT and the first audio carrier frequency $f_{T1}$. It can be seen from FIG. 8 that the first portion 245 of the frequency range is separated from the color auxiliary carrier frequency $f_{FHT}$ by a first protective frequency spacing $f_{S1}$ and from the first audio carrier frequency $f_{T1}$ by a second protective frequency spacing $f_{S2}$. A second portion 250 of the frequency range of the multiplex signal is transmitted between the first and second audio carrier frequencies $f_{T1}$ and $f_{T2}$ of the analog television signal. The second portion 250 of the frequency range is separated from the first audio carrier frequency $f_{T1}$ by a third protective frequency spacing $f_{S3}$ and from the second audio carrier frequency $f_{T2}$ by a fourth protective frequency spacing $f_{S4}$. A third portion 255 of the frequency range of the multiplex signal is transmitted between the second audio carrier frequency $f_{T2}$ of the analog television signal and the video carrier frequency $f_2$ of the upper channel, that is, the channel neighboring it toward higher frequencies. The third portion 255 of the frequency range is separated from the second audio carrier frequency $f_{T2}$ by a fifth protective frequency spacing $f_{S5}$ and from the video carrier frequency $f_2$ of the upper neighboring channel by a sixth protective frequency spacing $f_{S6}$. In this way, the aforementioned video and audio carrier frequencies $f_{FHT}$, $f_{T1}$, $f_{T2}$ and $f_2$ are prevented from being superimposed on the frequency range of the multiplex signal, so that resultant interference in reception of the digital multiplex signal is avoided.

It is also contemplated according to the invention that the described frequency range of the multiplex signal be used both in the forward and the reverse directions, with the goal of using existing broad band cable systems for interactive services as well as remote polling and/or remote control tasks. The described capability of transmitting digital supplementary data along with a digital radio or television program can then also be used in setting up interactive and/or telecommunications services.

Figure 8:
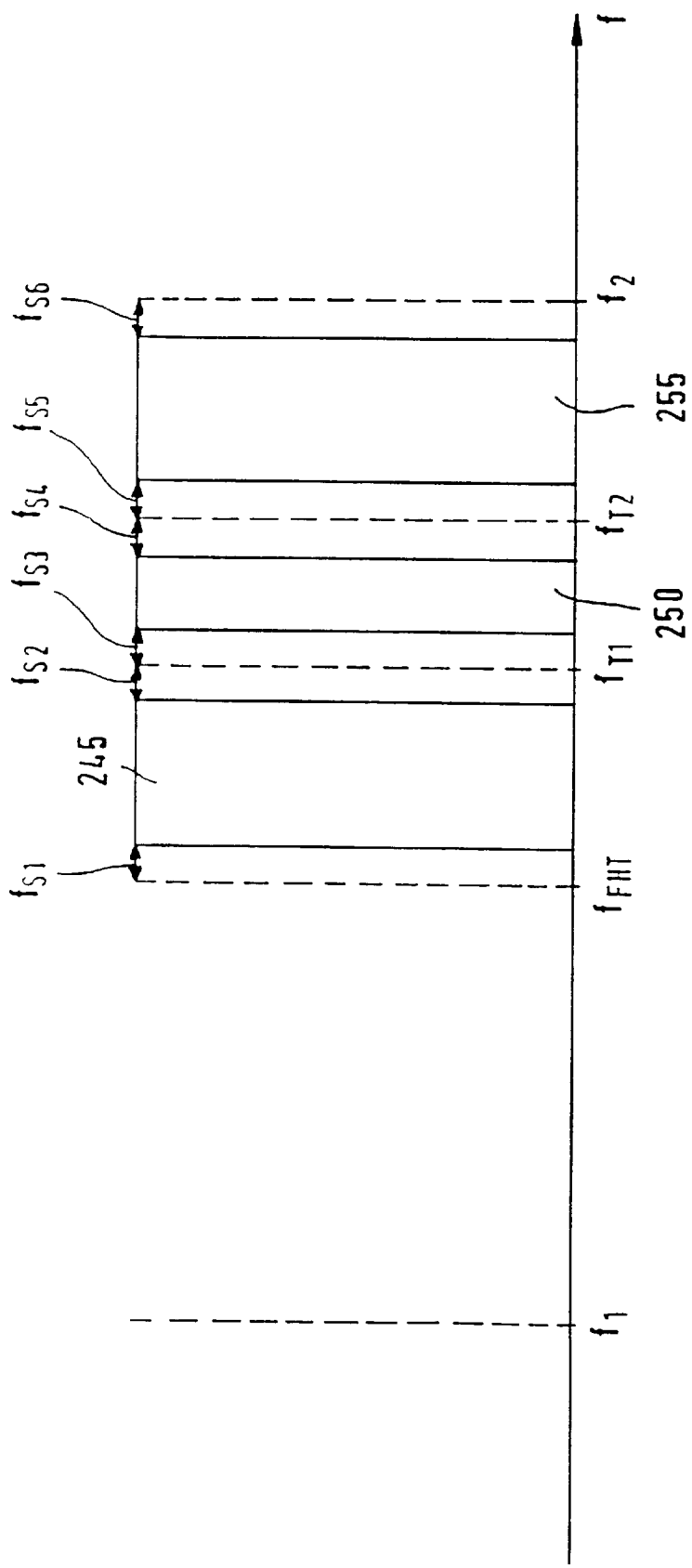
FIG. 8 is a graphical illustration showing protective frequency spacings of FIG. 7.

Finally, it is also possible to utilize the splitting up of the frequency range into three frequency blocks 245, 250 and 255 in accordance with FIG. 8 in such a way that one or two frequency blocks are used for transmitting digital data in the forward direction, and the remaining frequency blocks are used to transmit digital data in the reverse direction.

Figure 6:
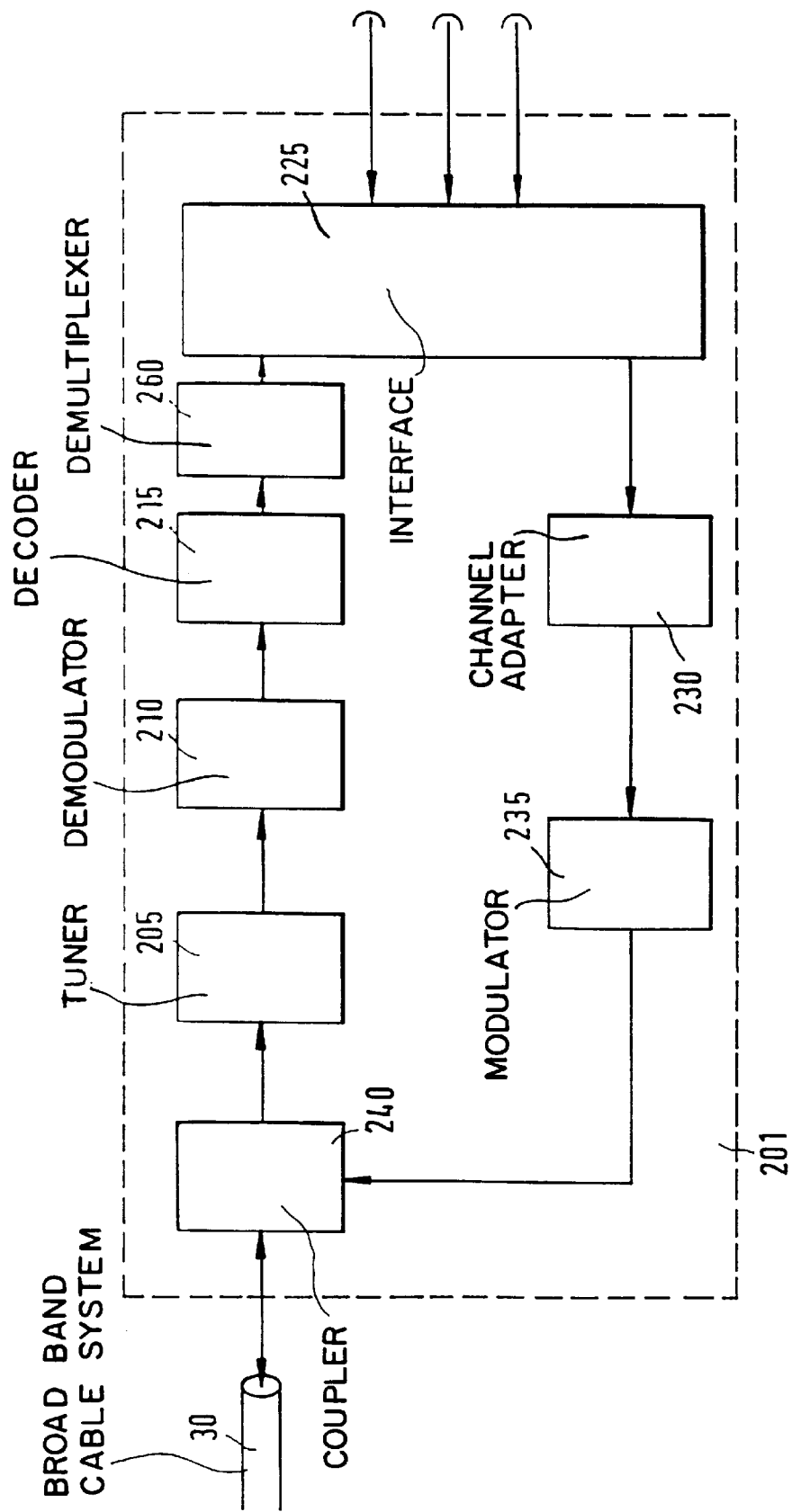
FIG. 6 is a block diagram of a transmitting and receiving apparatus according to the invention for OFDM-modulated digital multiplex signals.

In FIG. 6, an apparatus 201 is shown for transmitting and receiving digital multiplex signals modulated by an OFDM process. The multiplex signals are preferably radio and/or television signals, but may be any possible other digital signals, in particular those suitable for realizing interactive and/or telecommunications services. Here both frequency and multiplexing can be employed. In the apparatus shown in FIG. 6, a multiplexing process is employed. In FIG. 6, 240 designates a coupler for coupling the apparatus 201 to the broad band cable system 30. Connected to the coupler 240 are a tuner circuit 205 and a modulator 235. Connected to the tuner circuit 205 in turn is a demodulator 210, which is connected to the decoder 215. A first channel adaptation unit 230 is connected to the demodulator 235. The decoder 215 is connected via a demultiplexer 260 to an interface device 225, which is also connected to the channel adaptation unit 230. The aforementioned components are all contained within the apparatus 201.

Digital multiplex signals arriving at the apparatus 201 via the broad band cable system 30 are carried on to the tuner circuit 205 by the coupler 240, which carries out a directional separation between signals received and signals to be transmitted. In the tuner circuit 205, a channel of the transmitted frequency band is selected, and the frequency range of the digital multiplex signal to be received is filtered out. If an analog television signal is also superimposed on this frequency range as described above, then it is also possible for a suppression of corresponding video and/or audio carrier frequency components of the analog television signal to be done in the tuner circuit 205, so as to avert resultant interference upon reception. The tuned and filtered digital multiplex signal is also OFDM-modulated and is subjected to a corresponding demodulation in the demodulator 210. After the demodulation, a digital, error-protected, encoded base band data stream is available, which in the decoder 215 is subjected to error evaluation and decoding, which eliminates the data redundancy that is jointly transmitted, particularly for error protection purposes, and the result is that a decoded digital net data stream is present at the output of the decoder 215. The net data stream at the output of the decoder 215 is split in the demultiplexer 260 into individual digital signals, which in turn are passed on to the interface device 225. Three double-headed arrows at the interface device 225 in FIG. 6 indicate that data playback equipment, such as radio receivers, television sets, video cassette recorders, telephones, personal computers, and so forth, can be connected to the apparatus 201 via the interface device 225. An optical broad band distribution network can also be connected to the interface device 225, preferably using fiber optics, and after electrooptical conversion in the interface device 225, this network passes on the signals received from the apparatus 201. In the reception situation, the data playback equipment serve the purpose of optical or acoustical playback of the digital signals transmitted via the broad band cable system 30 and received by the apparatus 201. To realize interactive and/or telecommunications services, the apparatus 201 must also be prepared for transmitting digital signals, which are transmitted to the apparatus 201 by data playback equipment via the interface device 225, on to the broad band cable system 30. The same is true for digital data which are carried on to the apparatus 201 via the interface device 225 from an optical broad band distribution network connected to the interface device 225. To that end, the corresponding optoelectrical conversion of the digital signals from the optical broad band distribution network must be done in the interface device 225. For transmitting digital data from to the broad band cable system 30, the channel adaptation unit 230 is provided in the apparatus 201; this unit is used for encoding and combining the individual digital signals, transmitted to the apparatus 201 via the interface device 225, into a multiplex signal. The digital multiplex signal formed in the channel adaptation unit is ofdm-modulated in the modulator 235. In this process, carrier frequencies are used that are located in frequency channels intended for transmission of analog television signals. At the places where the analog television signal to be superimposed has video and audio carrier frequencies that interfere with reception, no carrier frequencies are provided in the modulator 235, and thus the aforementioned six protective frequency spacings $f_{S1}$, $f_{S2}$, $f_{S3}$, $f_{S4}$, $f_{S5}$ and $f_{S6}$ of FIG. 8 are observed. The omission of the corresponding carriers is also known as frequency blanking. Because of this frequency blanking, the data rate of the digital multiplex signal is reduced. Via the coupler 240, the thus-modulated digital OFDM multiplex signal is supplied to the broad band cable system 30.

What is claimed is:

1. A method for common transmission of digital-modulated signals and analog-modulated signals, said method comprising the steps of:

a) transmitting at least one digital signal together with an analog television signal in a common channel of at least one communications channel;
   b) controlling a signal level of the at least one digital signal so that said signal level of the at least one digital signal does not exceed a predetermined digital signal level;
   c) controlling a signal level of the analog television signal so that said signal level of the analog television signal does not drop below a predetermined analog signal level which is much greater than the predetermined digital signal level;
   d) controlling the at least one digital signal so that an amplitude of a frequency spectrum of the at least one digital signal does not exceed a predetermined amplitude value, which is much lower than an amplitude of a video carrier of the analog television signal; and
   e) controlling the at least one digital signal so that the frequency spectrum of the at least one digital signal is limited to a frequency range smaller than a width of the common channel;
   wherein the at least one digital signal comprises at least one of at least one radio signal and at least one television signal.

2. The method as defined in claim 1, further comprising common transmission of said digital-modulated and said analog-modulated signals over broadband cable system.

3. The method as defined in claim 1, further comprising reducing a data quantity of the at least one digital signal by coding.

4. The method as defined in claim 1, further comprising transmitting digital supplementary data in the frequency range of the at least one digital signal.

5. The method as defined in claim 1, wherein the frequency range of the at least one digital signal extends between a color auxiliary carrier frequency of the analog television signal and a video carrier frequency of a neighboring channel adjacent to the common channel and the frequency range is separated from both the color auxiliary carrier frequency and the video carrier frequency of the neighboring by respective protective frequency spacing.

6. The method as defined in claim 1, wherein the analog television signal has audio carrier frequency components and further comprising transmitting said audio carrier frequency components with a predetermined attenuation.

7. The method as defined in claim 1, further comprising attenuating interfering video and audio carrier frequency components of the analog television signal by means of filter circuitry provided in a decoder for decoding said at least one digital signal.

8. The method as defined in claim 1, further comprising combining a plurality of individual digital signals into respective blocks and transmitting said individual digital signals in said blocks in the at least one channel and at least two of said individual signals have respective frequency ranges separated from each other by a protective frequency difference.

9. The method as defined in claim 1, wherein said at least one digital signal is transmitted in enciphered form.

10. The method as defined in claim 1, further comprising modulating said at least one digital signal by a coded orthogonal frequency division multiplexing method to form at least one multiplexed modulated signal and transmitting the multiplexed modulated signal.

11. The method as defined in claim 10, further comprising selecting carrier frequencies for the modulating such that are not less than a predetermined frequency difference below an audio carrier frequency of the analog television signal.

12. The method as defined in claim 10, further comprising selecting carrier frequencies for the modulating such that are not less than a predetermined frequency difference below a color auxiliary carrier frequency of the analog television signal.

13. The method as defined in claim 10, further comprising selecting carrier frequencies for the modulating such that are not less than a predetermined frequency difference below a video carrier frequency of the analog television signal or a video carrier frequency of another analog television signal in an adjacent channel.

14. A method for common transmission of digital-modulated signals and analog-modulated signals, said method comprising the steps of:
   a) transmitting at least one digital signal together with an analog television signal in a common channel of at least one communications channel;
   b) controlling a signal level of the at least one digital signal so that said signal level of the at least one digital signal does not exceed a predetermined digital signal level;
   c) controlling a signal level of the analog television signal so that said signal level of the analog television signal does not drop below a predetermined analog signal level which is much greater than the predetermined digital signal level;
   d) controlling the at least one digital signal so that an amplitude of a frequency spectrum of the at least one digital signal does not exceed a predetermined amplitude value, which is much lower than an amplitude of a video carrier of the analog television signal; and
   e) controlling the at least one digital signal so that the frequency spectrum of the at least one digital signal is limited to a frequency range smaller than a width of the common channel; and
   f) combining the at least one digital signal together with said analog television signal in a multiplex signal prior to the transmitting of step a);
   wherein the at least one digital signal comprises at least one of at least one radio signal and at least one television signal and at least a portion of a frequency range of the at least one digital signal combined in the multiplex signal is transmitted between a video carrier frequency and an audio carrier frequency of the analog television signal and is separated from both the video carrier frequency and the audio carrier frequency by respective protective frequency spacing.

15. A method for common transmission of digital-modulated signals and analog-modulated signals, said method comprising the steps of:
   a) transmitting at least one digital signal together with an analog television signal in a common channel of at least one communications channel;
   b) controlling a signal level of the at least one digital signal so that said signal level of the at least one digital signal does not exceed a predetermined digital signal level;
   c) controlling a signal level of the analog television signal so that said signal level of the analog television signal does not drop below a predetermined analog signal level which is much greater than the predetermined digital signal level;
   d) controlling the at least one digital signal so that an amplitude of a frequency spectrum of the at least one digital signal does not exceed a predetermined amplitude value, which is much lower than an amplitude of a video carrier of the analog television signal; and
   e) controlling the at least one digital signal so that the frequency spectrum of the at least one digital signal is limited to a frequency range smaller than a width of the common channel; and
   f) combining the at least one digital signal together with said analog television signal in a multiplex signal prior to the transmitting of step a);
   wherein the at least one digital signal comprises at least one of at least one radio signal and at least one television signal and at least a portion of a frequency range of the at least one digital signal combined in the multiplex signal is transmitted between one audio carrier frequency and another audio carrier frequency of the analog television signal and is separated from both the audio carrier frequencies by respective protective frequency spacing.

16. A method for common transmission of digital-modulated signals and analog-modulated signals, said method comprising the steps of:
   a) transmitting at least one digital signal at least partially together with an analog television signal in a common channel of at least one communications channel;
   b) controlling a signal level of the at least one digital signal so that said signal level of the at least one digital signal does not exceed a predetermined digital signal level;
   c) controlling a signal level of the analog television signal so that said signal level of the analog television signal does not drop below a predetermined analog signal level which is much greater than the predetermined digital signal level;
   d) controlling the at least one digital signal so that an amplitude of a frequency spectrum of the at least one digital signal does not exceed a predetermined amplitude value, which is much lower than an amplitude of a video carrier of the analog television signal;
   e) controlling the at least one digital signal so that the frequency spectrum of the at least one digital signal is limited to a frequency range smaller than a width of the common channel; and
   f) combining the at least one digital signal together with said analog television signal in a multiplex signal prior to the transmitting of step a);
   wherein the at least one digital signal comprises at least one of at least one radio signal and at least one television signal and at least a portion of a frequency range of the at least one digital signal combined in the multiplex signal is transmitted between a video carrier frequency of a channel adjacent to the common channel and an audio carrier frequency of the analog television signal and is separated from both the video carrier frequency and the audio carrier frequency by respective protective frequency spacing.

17. The method as defined in claim 1, further comprising combining the at least one digital signal into a multiplex signal in any arbitrary direction.

18. The method as defined in claim wherein the digital-modulated signals are transmitted by a first transmitter and the analog-modulated signals are transmitted by a second transmitter.

19. The method as defined in claim 1, wherein the digital-modulated signals and the analog-modulated signals are transmitted by a single transmitter.

20. An apparatus (201) for transmitting and receiving digital multiplex signals modulated by a coded orthogonal frequency division multiplexing method, said apparatus comprising a receiving portion and a transmitting portion;

wherein said receiving portion comprises a tuner circuit (205) for selecting a channel of a transmitted frequency band, a demodulator (210) for demodulating modulated signals from the tuner circuit in said channel to form demodulated signals including demodulated digital signals, a decoder (215) for error evaluation of the demodulated digital signals, a demultiplexer (260) for splitting the demodulated signals into individual digital signals and an interface device (225) for transferring the individual digital signals to data playback devices and an optical broadband distribution network; and wherein said transmitting portion comprises a channel adaptation unit (30) for combining and coding individual digital signals received from at least one of the data playback devices and the optical broadband distribution network via said interface device (225) to form multiplex signals; a modulator (235) for modulating the multiplex signals from the channel adaptation unit at carrier frequencies in predetermined frequency channels and a coupler (240) for connection to a broadband cable system (30), said coupler (240) being connected to the tuner circuit (205) and the modulator (235).

21. The apparatus as defined in claim 20, wherein the frequency channels for the multiplex signal are for transmission of the analog television signal.

22. The apparatus as defined in claim 20, wherein the modulator (235) includes means for reducing a data rate of the multiplex signal and the multiplex signal has signal components to be modulated at selected carrier frequencies that exceed by a predetermined frequency spacing the greatest of at least one audio carrier frequency, at least one color auxiliary carrier frequency or at least one video carrier frequency of the analog television signal.

* * * * *